(12) United States Patent
Yurtsev et al.

(10) Patent No.: US 11,620,282 B2
(45) Date of Patent: Apr. 4, 2023

(54) AUTOMATED INFORMATION RETRIEVAL SYSTEM AND SEMANTIC PARSING

(71) Applicant: S&P Global Inc., New York, NY (US)

(72) Inventors: Eugene Yurtsev, Somerville, MA (US); Vadym Barda, Boston, MA (US); Maxim Sokolov, Watertown, MA (US); Jeremy Lopez, New York, NY (US); Eli Rosen, Newton, MA (US); Ben Cohen, Watertown, MA (US); Qibo Chen, New York, NY (US); Hamima Halim, Boston, MA (US); Anurag Rai, Somerville, MA (US); Josh Shapiro, Toronto (CA); Predrag Gruevski, Somerville, MA (US); Kyle Sargent, Cambridge, MA (US); Bojan Serafimov, Atlantic Highlands, NJ (US)

(73) Assignee: S&P Global Inc., New York, NY (US)

( * ) Notice: Subject to any disclaimer, the term of this patent is extended or adjusted under 35 U.S.C. 154(b) by 188 days.

(21) Appl. No.: 16/907,888

(22) Filed: Jun. 22, 2020

(65) Prior Publication Data
US 2021/0397609 A1 Dec. 23, 2021

(51) Int. Cl.
| | | |
|---|---|---|
| *G06F 16/30* | (2019.01) | |
| *G06F 16/242* | (2019.01) | |
| *G06F 16/2455* | (2019.01) | |
| *G06F 16/248* | (2019.01) | |
| *G06F 16/21* | (2019.01) | |
| *G06F 16/2452* | (2019.01) | |
| *G06F 16/28* | (2019.01) | |
| *G06N 5/02* | (2023.01) | |
| *G06F 16/2457* | (2019.01) | |

(52) U.S. Cl.
CPC ........ *G06F 16/2423* (2019.01); *G06F 16/211* (2019.01); *G06F 16/248* (2019.01); *G06F 16/2455* (2019.01); *G06F 16/24522* (2019.01); *G06F 16/24573* (2019.01); *G06F 16/288* (2019.01); *G06N 5/02* (2013.01); *G06F 16/2433* (2019.01)

(58) Field of Classification Search
CPC .. G06F 16/93; G06F 16/3322; G06F 16/9027; G06F 16/242; G06F 16/2423; G06F 16/24573; G06F 16/2455; G06F 16/211; G06F 16/24522; G06F 16/288; G06F 16/248; G06F 16/2433
USPC ........ 707/609, 687, 705, 769, 790, 813, 821
See application file for complete search history.

(56) References Cited

U.S. PATENT DOCUMENTS

| | | | | |
|---|---|---|---|---|
| 2011/0282892 A1* | 11/2011 | Castellani | ............ | G06F 16/242 707/766 |
| 2012/0047025 A1* | 2/2012 | Strohman | ........... | G06F 16/3322 705/14.71 |

(Continued)

*Primary Examiner* — Sana A Al-Hashemi
(74) *Attorney, Agent, or Firm* — Yee & Associates, P.C.

(57) ABSTRACT

A method of information retrieval is provided. The method comprises receiving a query from a user and parsing the query in real-time as the user enters the query. The parsed query is interpreted dynamically based on a defined schema of a knowledge base, and a number of query interpretations is displayed in real-time as the user enters the query. When a selection of one of the query interpretations is received from the user information is retrieved from the knowledge base according to the selected query interpretation.

25 Claims, 6 Drawing Sheets

(56) References Cited

U.S. PATENT DOCUMENTS

| | | | | |
|---|---|---|---|---|
| 2012/0150920 A1* | 6/2012 | Roulland | ............... | G06F 16/93 |
| | | | | 707/E17.085 |
| 2014/0201331 A1* | 7/2014 | Kershaw | ............... | G06Q 10/06 |
| | | | | 709/219 |
| 2016/0041986 A1* | 2/2016 | Nguyen | ............... | G06Q 50/01 |
| | | | | 707/711 |
| 2018/0342323 A1* | 11/2018 | Shankar | ............... | G16H 10/60 |

* cited by examiner

AUTOMATED INFORMATION RETRIEVAL SYSTEM AND SEMANTIC PARSING

BACKGROUND INFORMATION

1. Field

The present disclosure relates generally to an improved information retrieval system, and more specifically to an information retrieval system that can interpret a user inquiry in real time according to an established schema.

2. Background

The goal of information retrieval (IR) systems is to retrieve information relevant to the user's query from a knowledge base. Knowledge bases can vary significantly. For example, some knowledge bases consist entirely of unstructured data (e.g., new documents), while other knowledge bases might consist of structured data (e.g., SQL database or RDF store).

Most IR systems tend to be tailored for particular data sets. In these cases, developers load a data set into an existing search engine. The primary responsibility of the search engines is to store data in a representation that allows the developer to efficiently query the underlying data with various types of queries. These queries might be thought of as low-level primitives (e.g., find documents with the keyword "phones").

Typically, a developer has to spend significant time preprocessing and loading data into a search engine and finding a composition of low-level primitive queries that work with the particular data set. For realistic data sets, it can take months for a developer to load a single data set into a system.

Therefore, it would be desirable to have a method and apparatus that take into account at least some of the issues discussed above, as well as other possible issues.

SUMMARY

An embodiment of the present disclosure provides a computer-implemented method of information retrieval. The method comprises receiving a query from a user and parsing the query in real-time as the user enters the query. The parsed query is interpreted dynamically based on a defined schema of a knowledge base, and a number of query interpretations is displayed in real-time as the user enters the query. When a selection of one of the query interpretations is received from the user information is retrieved from the knowledge base according to the selected query interpretation.

Another embodiment provides an information retrieval system. The system comprises a storage device configured to store program instructions and one or more processors operably connected to the storage device and configured to execute the program instructions to cause the system to: receive a query from a user; parse the query in real-time as the user enters the query; interpret the parsed query dynamically based on a defined schema of a knowledge base; display a number of query interpretations in real-time as the user enters the query; receive a selection from the user of one of the query interpretations; and retrieve information from the knowledge base according to the selected query interpretation.

Another embodiment provides a computer program product for retrieving information. The computer program product comprises a non-volatile computer readable storage medium having program instructions stored thereon to perform the steps of: receiving a query from a user; parsing the query in real-time as the user enters the query; interpreting the parsed query dynamically based on a defined schema of a knowledge base; displaying a number of query interpretations in real-time as the user enters the query; receiving a selection from the user of one of the query interpretations; and retrieving information from the knowledge base according to the selected query interpretation.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that knowledge bases can vary significantly and that IR systems tend to be tailored for particular data sets.

The illustrative embodiments provide an IR system that informs the user as to how the user's query is being interpreted, which might include multiple possible interpretations.

The illustrative embodiments also provide a semantic parser that uses a schematic description of a knowledge base to automatically generate an IR system using data that already exists in the knowledge base. The IR system does not necessitate the collection of training data to bootstrap the system.

Figure 1:
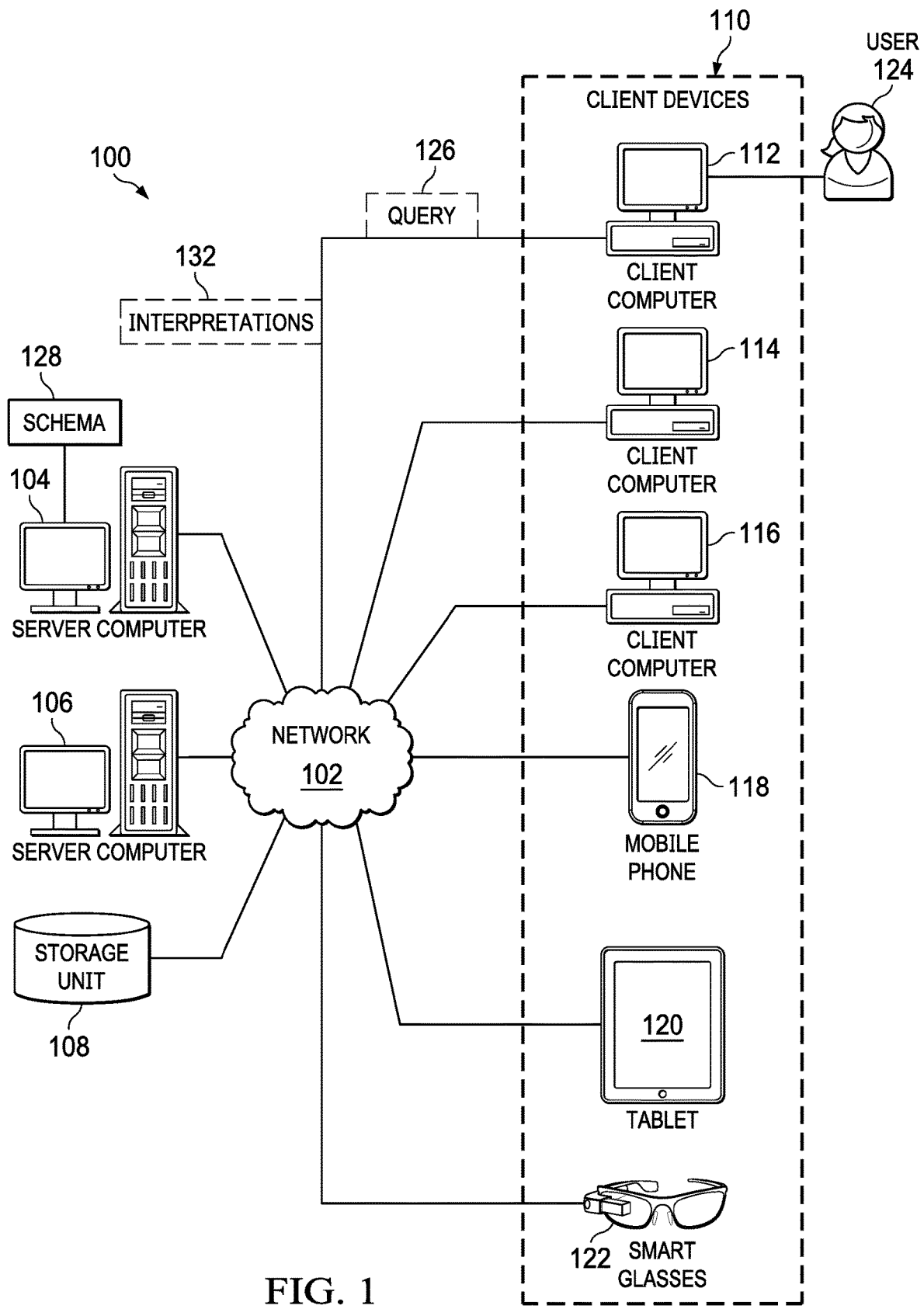
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In this illustrative example, user 124 at client computer 112 can submit query 132 to server computer 104. In this illustrative example, server computer 104 might provide interpretations 126 of query 126 in real-time according to a schema 128 as user 124 is entering the query.

Figure 2:
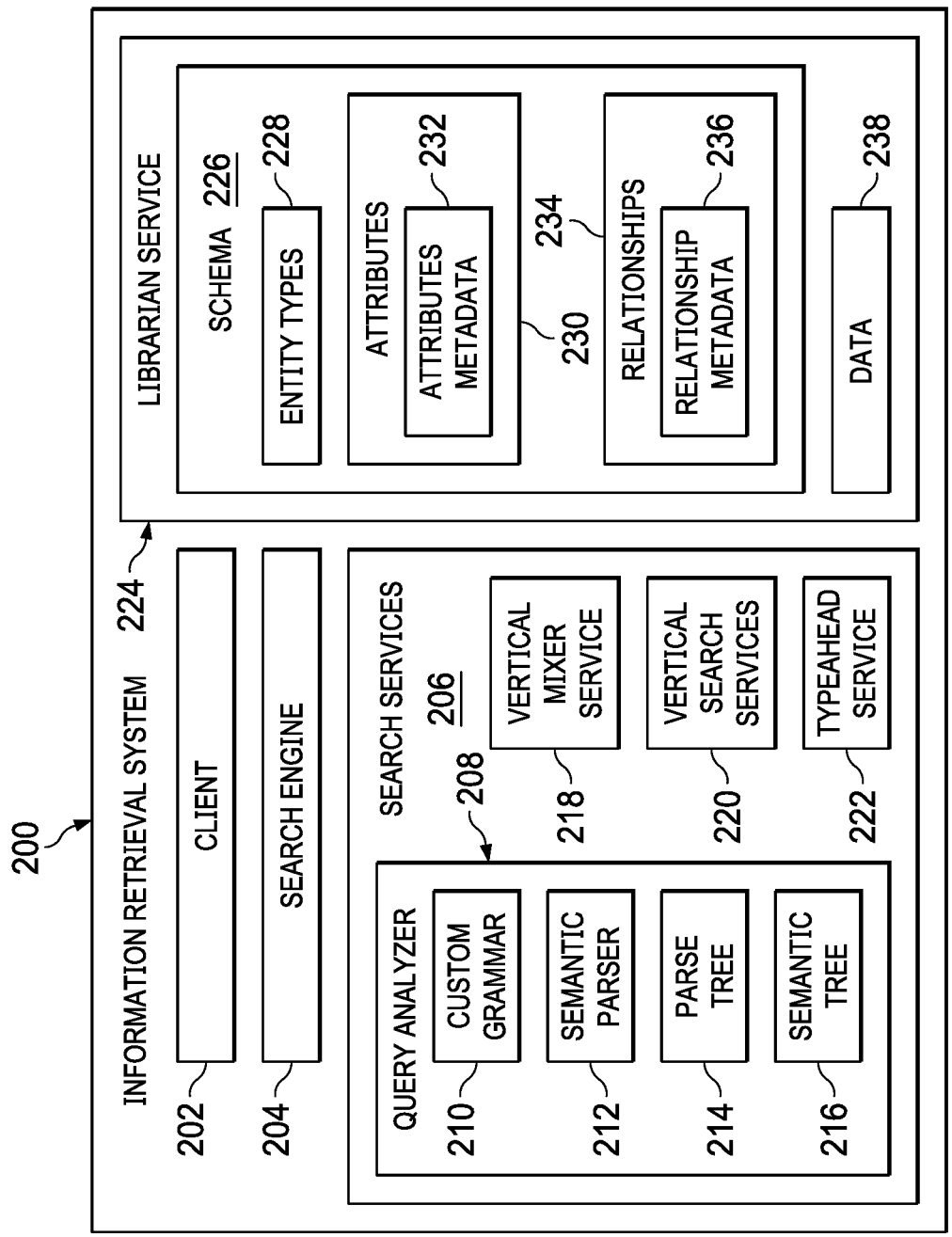
FIG. 2 depicts a block diagram of an information retrieval (IR) system in accordance with an illustrative embodiment.

FIG. 2 depicts a block diagram of an information retrieval (IR) system in accordance with an illustrative embodiment. IR system 200 might be implemented in data processing system 100 in FIG. 1.

IR system 200 comprises search services 206 that receive search queries from client device 202. Search services 206 comprise typeahead service 222 that forwards a user query to query analyzer 208, which analyzes and interprets the meaning of the query in real time as it is being entered by the user. Query analyzer 208 comprises customer grammar 210, which it uses to implement semantic parser 212. Query analyzer 208 generates parse tree 214 and semantic tree 216 that represent different possible interpretations of the query.

Search services 206 also comprise vertical mixer service 218 that forwards a user-selected interpretation of the query to search engine 204. Search services 206 might also comprise vertical search services 220 that provide specialized search engines that focus on specific topics and expose a common remote procedure call to vertical mixer service 218.

IR system 200 also comprises librarian service 224 that includes a schema 226 that presents data 238 in a standardized format. Schema 226 comprises a description of all the entity types 228 that exist in the knowledge base. Schema 226 also comprises attributes 230 of the entity types 228. Attributes 230 include attribute metadata 232. Schema 226 also comprises relationships 234 between the entity types 228. Relationships 234 includes relationship metadata 236.

Figure 3:
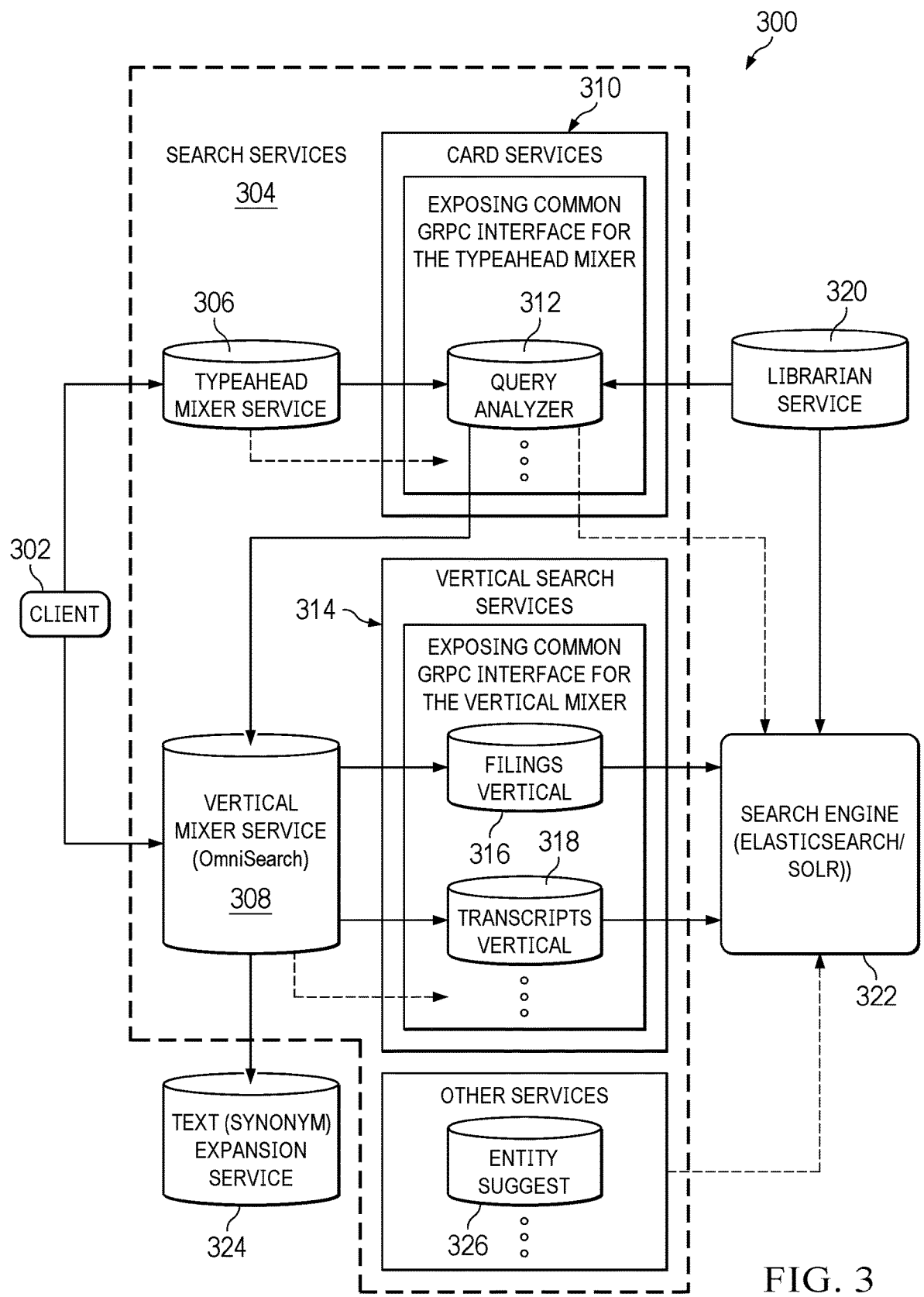
FIG. 3 depicts a schematic of an information retrieval system in accordance with an illustrative embodiment.

FIG. 3 depicts a schematic of an information retrieval system in accordance with an illustrative embodiment. IR system 300 might be an example implementation of IR system 200 in FIG. 2.

IR system 300 comprises search services 304, a librarian service 320, and a search engine 322. Librarian service 320 sits between consumers of the data (e.g., search engine 322 or query analyzer 312) and the providers of raw data (e.g., a knowledge base like a SQL database).

Librarian service 320 can "wrap" an existing knowledge base to provide a new knowledge base that presents data to downstream services in a standardized representation. For example, librarian service 320 might be implemented as a virtual database. Librarian service 320 allows downstream services to incorporate diverse data easily, allowing much of the IR system to be generated automatically. This representation will typically differ from the representation of the data in the original knowledge base and is useful because it is specifically tailored to power downstream applications.

Librarian service 320 has three primary responsibilities. It translates raw data that in the knowledge base (e.g., SQL database) into a schema that can be consumed by downstream services like search. Librarian service 320 also provides an endpoint that allows a consumer of the data (e.g., search, nlp engine) to fetch a schematic description of the data. Librarian service 320 also provides an endpoint that allows a consumer of the data (e.g., search, nlp engine) to stream specific subsets of the data that conforms to the schema.

The schema that the librarian service 320 provides comprises a number of components. The schema comprises a description of all the entity types that exist in the knowledge base. For example, entity types might include "Companies," "Filings," "Celebrities," "Power Plants," "Financial Assets." The schema also comprises a description of all the attributes that exist for all entity types in the knowledge base. For example, a company can have a name, an alias, an identifier, a foundation year, a YTD revenue, etc. The schema includes a description of relationships between entities. For example, a filing can be associated with a company via a FilingIssuer relationship. Both attributes and relationships contain metadata that describe, e.g., their machine id, type, display name, alternative names, and popularity scores. The schema supports inheritance so that child entities can be derived from parent entities.

A potential consumer of the librarian service 320 is able to query the schema of the knowledge base to learn about the types of data that exist in the knowledge base as well as how these types of data are inter-connected.

For example, to auto-generate a document from a particular knowledge base that contains filings, transcripts, and companies, IR system 300 would first query the librarian service 320 to learn that filings and transcripts are document types. Then IR system 300 would query the librarian service 320 and learn that both document types (filings and transcripts) are associated with a company according to an issuing relationship. Finally, filings and transcripts are fetched from the librarian service 320 and loaded into the search engine 322.

Knowing the documents are associated with an issuing company allows the code that loads the data into the search engine 322 to automatically attach relevant metadata about the issuing company and pre-process it as needed. Such metadata can then be leveraged by the search services 314 to support more complicated searches that may require filtering (e.g., retrieving documents that were issued by Company XX). This knowledge can also be used to automatically populate various user interface (UI) widgets in the application (e.g., widgets that allow a user to request documents that were issued by companies that are based in France).

The setup of IR system 300 comprises two stages. The first stage includes obtaining a description of what data exists and how it is structured, which is used for querying the librarian schema. Search services 304 connect to the librarian service 320 and queries it for information about what types of entities exist, what properties different types of entities have, and what relationships exist between different types of entities.

Based on the above information, the IR system 300 can determine how to structure the data for storage and retrieval. Specifically, the list of entity types provided by the librarian service 320 is used to infer which content sets are available for search. Properties and relationships associated with each entity type can be used to determine the underlying data representation in the search engine 322. In addition, search filters can be automatically created from information about which relationships exist. An example of a search filter would be the ability to select a subset of documents that were issued by company X. Librarian service 320 provides additional information that describes filters that the IR system 300 can expose to a UI in client 302.

The second stage comprises indexing entity data into the search engine 322, which is used for querying data. Search services 304 connect to librarian service 320 and download all entity instances for a particular entity type (repeating this for all relevant entity types). At the end of this stage, all the search content is loaded and is available for retrieval. Once IR system 300 is set up, it can be used to retrieve information.

Search services 304 comprise a typeahead mixer service 306 and vertical mixer 308. Typeahead mixer 306 and vertical mixer 308 implement federated searches wherein a query request is distributed to multiple search engines, databases, or query engines participating in a federation. Results are then aggregated and presented to the user. Typeahead mixer service 306 performs a federated search across possible auto-completion candidates for a query as the user is typing. Typeahead mixer service 306 anticipates query entries in client 302 and provides real-time autocomplete suggestions to the user through the UI. (See FIG. 4.) A number of card services 310 expose a common remote procedure call for the typeahead mixer service 306. Chief among card services 310 is query analyzer 312.

Query analyzer 312 is responsible for accepting a user query from client 302 (e.g., a string of characters formed in natural language), analyzing it, and translating it into zero or more query interpretations. Query analyzer 312 generates a semantic parser using information it retrieves from the middle tier service (i.e. librarian service 320). The semantic parser works by performing part of speech tagging on the input user query. After part of speech tagging, query analyzer 312 uses a custom grammar that leverages both the parts of speech tags as well as the schema of the data to determine what the user's query means.

Query analyzer 312 will output zero query interpretations when it cannot make sense of the user's request (e.g., consider the query: "qwoiejdniu12hdiu"). Query analyzer 312 might output more than one interpretation when the original query is ambiguous (e.g., for the query "companies in Paris," the user may be looking for either companies in Paris, France or Paris, Tex.).

Each query interpretation contains precise machine instructions that can be executed by IR system 300 to retrieve any relevant information for the given interpretation. Query interpretations may also contain other information. For example, a query interpretation might contain display information that is used to clarify to the user how the query was interpreted.

The query analyzer 312 first queries the schema of librarian service 320 and then queries the librarian service for data. Query analyzer 312 leverage both schematic information and actual data to perform semantic parsing of the query. Usage of schematic information by the query analyzer 312 allows the semantic parser to determine which types of questions are answerable using data in the IR system 300, which enables the semantic parser to only display interpretations of the user's query that are sensible in the context of the data, thereby greatly improving the quality of interpretations. For example, in a financial application the word "filing" will typically refer to a financial filing (a document) rather than to an iron filing (a small particle of iron). Schema information about available entities enables the query analyzer to understand that the keyword "publication date" corresponds to a property of documents, whereas keyword "based in" corresponds to a domicile relationship between a company and a region. Usage of data allows query analyzer 312 to determine, e.g., the United States of America is a country, and the keyword "US" in an alias for the United States of America.

When the user is ready to execute a new search, the search is performed by vertical mixer service (e.g., OmniSearch) 308. Vertical mixer 308 performs a federated search across all content sets. The user might execute the new search by selecting a typeahead suggestion provided by typeahead service 306 or directly interacting with the available UI elements for searching, filtering, and sorting (e.g., a search bar, filter widgets to filter by date, document type, etc.).

Vertical search services 314 expose a common communication protocol interface (e.g., gRPC, REST) for vertical mixer 308. Vertical search services 314 comprise a number of specialized search engines that focus on specific topics. In the present example, vertical search services include vertical searches for filings 316 and vertical searches for transcripts 318. Of course, other types of vertical searches might also be included.

Client 302 communicates with vertical mixer service 308 via an application programming interface (API) call. When a user executes a new search, a new vertical mixer (i.e. OmniSearch) request is generated that contains a query string and filter information in a format that is consistent with the response from the typeahead service 306 (assuming a typeahead suggestion is selected). The vertical mixer service 308 in turn returns a vertical search response that contains search results together with all metadata necessary for displaying the results to the end user through client 302.

IR system 300 might also comprise text expansion service 324 that provides synonyms for searches based on the query analysis. In addition, search services 304 might also comprise other services such as, e.g., entity suggestions 326.

Figure 4:
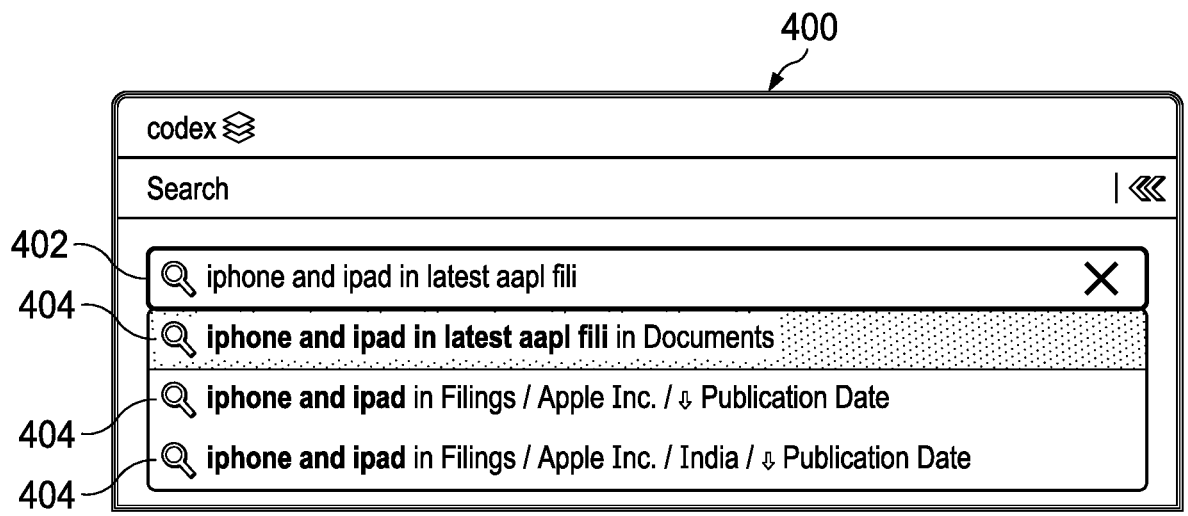
FIG. 4 illustrates typeahead suggestions in a user interface in accordance with an illustrative embodiment.

FIG. 4 illustrates typeahead suggestions in a user interface in accordance with an illustrative embodiment. UI 400 might run on client 302 in FIG. 3.

Users interact with the IR system 300 mainly via a search bar 402 in interface 400. As a user starts typing, typeahead service 306 begins to analyze the user's query, simultaneously suggesting possible interpretations as well as attempting to autocomplete the user's input. Each of the typeahead suggestions comprises a self-contained search that is ready to be executed. A search can consist of keywords, filters or sorting criteria.

Suggestions may be presented to a user in a form of cards 404 which contain all the metadata necessary for executing a new search. A user may choose to click on one of these cards, in which case a new search is performed. Alternatively, a user might want to ignore typeahead suggestions, in which case the user can just execute freeform text search, bypassing any query analysis. Users still retain the ability to customize their search, adding filters and sorting criteria as necessary via corresponding UI elements.

Whenever a user modifies a query in the search bar 402, a new typeahead request is generated. The typeahead service 306 returns a response in the form of a card 404.

Figure 5:
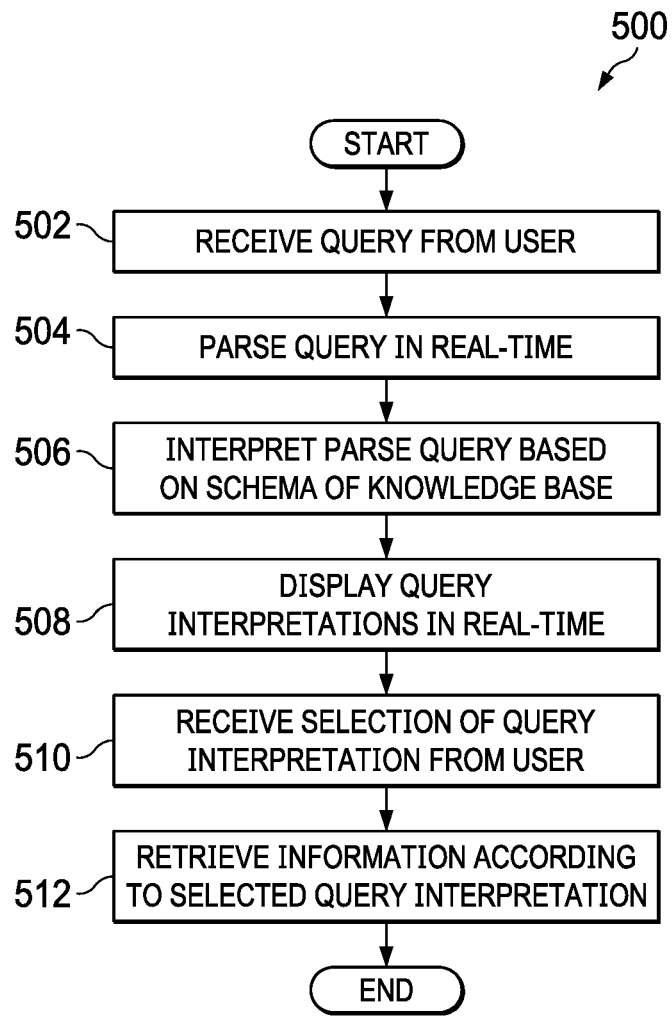
FIG. 5 depicts a flowchart illustrating a process for information retrieval in accordance with an illustrative embodiment.

FIG. 5 depicts a flowchart illustrating a process for information retrieval in accordance with an illustrative embodiment. Process 500 might be implemented with IR system 200 in FIG. 2 and IR system 300 in FIG. 3.

Process 500 begins by the system receiving a query from a user (step 502). The system parses the query in real-time as the user enters the query (step 504).

The system interprets the parsed query dynamically based on a defined schema of a knowledge base (step 506). The knowledge base might comprise both structured and unstructured data. Interpreting the parsed query might comprise generating a semantic tree from a parse tree according to a custom grammar that recursively inspects word combinations and merges them into higher order primitives that are answerable using data in the knowledge base.

A librarian service can represent data in the knowledge base in a standardized representation according to the defined schema. The defined schema might comprise, e.g., a description of entity types in the knowledge base, a description of attributes that exist for all entity types in the knowledge base, and a description of relationships between entities in the knowledge base. The attributes and relationships might contain metadata that describe, e.g., unique machine identifier, type, display name, alternative names, and popularity score. The schema might also support inheritance wherein child entities can be derived from parent entities.

The system displays a number of query interpretations in real-time as the user enters the query (step 508). The query interpretations comprise parameterized suggested searches that include filter and sorting criteria and can change in real-time as the user continues entering the query.

The system receives a selection from the user of one of the query interpretations that correctly matches the user's intent (step 510) and retrieves information from the knowledge base according to the selected query interpretation (step 512). Each query interpretation might include machine instructions for how to retrieve information from the knowledge base. Documents in the knowledge base can be automatically pre-processed and document metadata stored in a queryable format. Process 500 then ends.

Figure 6:
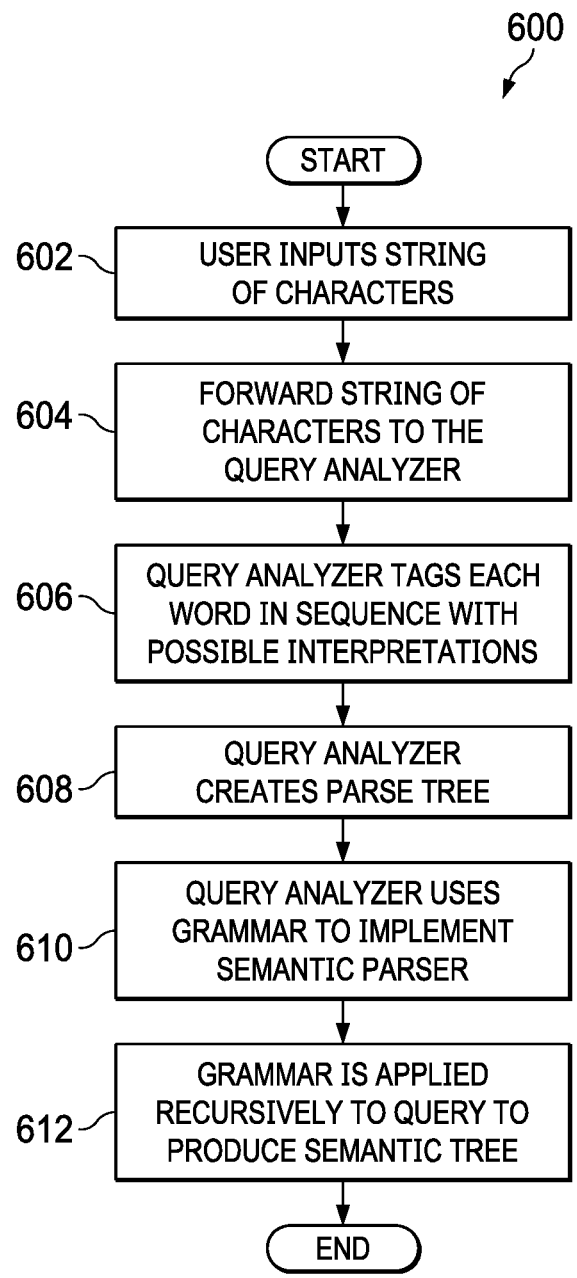
FIG. 6 depicts a flowchart illustrating the process of query analysis in accordance with an illustrative embodiment.

FIG. 6 depicts a flowchart illustrating the process of query analysis in accordance with an illustrative embodiment. Process 600 might be a more detailed example of steps 504 and 506 in FIG. 5.

Process 600 begins with a user inputting a string of characters (step 602). This string of characters is forwarded to the query analyzer (step 604).

The query analyzer tags each word in the sequence with all possible interpretations (step 606). For example, the word "china" might refer either to the country of China or to ceramics. At the end of the tagging process, the query analyzer has produced a parse tree (step 608). The query analyzer produces a parse tree instead of a parse sequence because the tree structure can represent multiple interpretations that might be associated with each word. However, knowing the interpretations is not enough to understand how to interpret a sentence.

The query analyzer uses a grammar to implement a semantic parser (step 610). The grammar inspects combinations of words and merges them into higher order primitives. For example, the words and symbols "revenue,">, and $100 might be merged to produce a filtering primitive that instructs the underlying backend search service to filter the records to keep records where the column with the identifier corresponds to revenue that has a value greater than $100.

The grammar is then applied recursively to the query to produce a semantic tree (step 612). The semantic tree contains enough information to show a user how the query was interpreted and to translate the input string into precise machine instructions that can be executed. Process 600 then ends.

Figure 7:
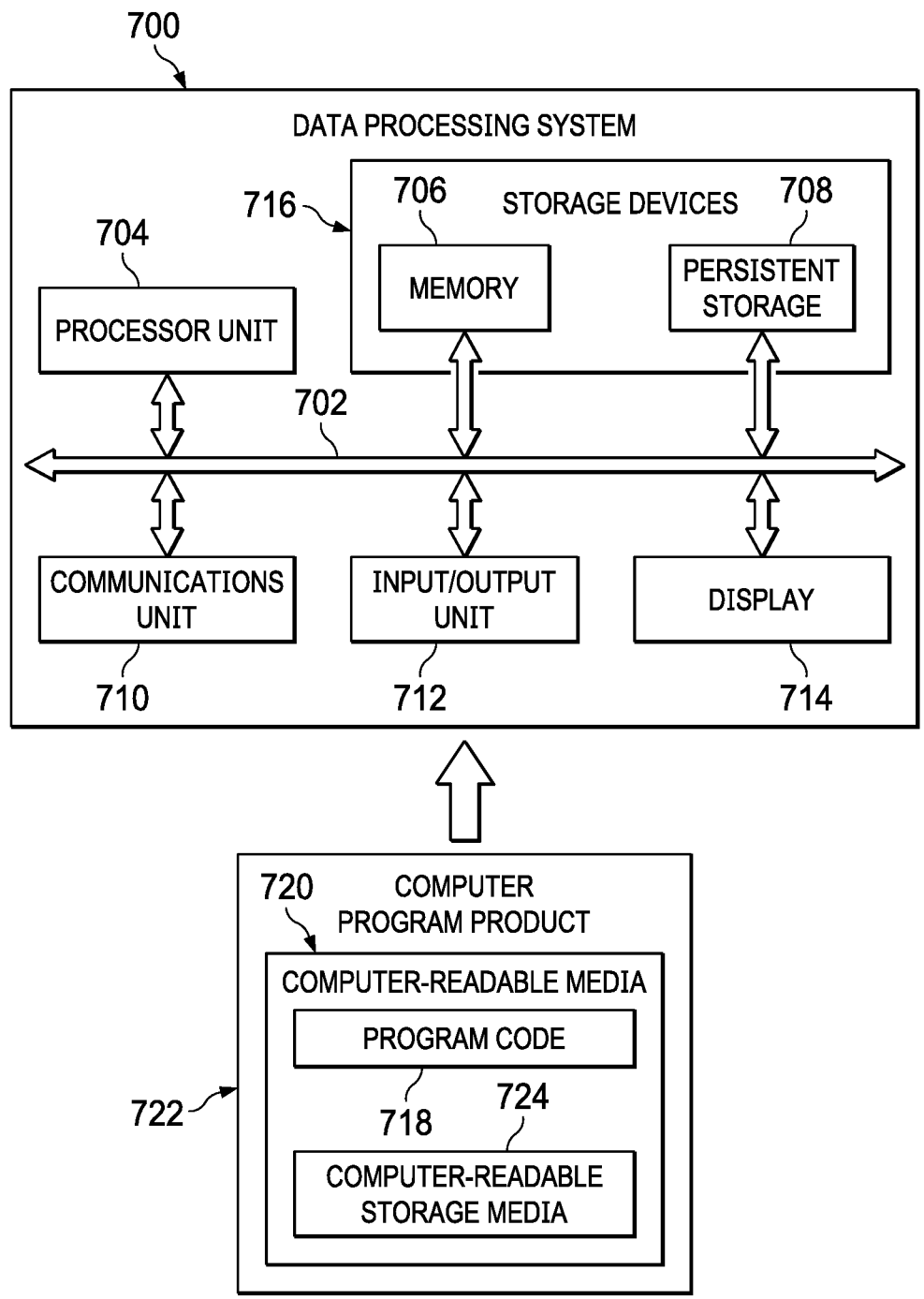
FIG. 7 is a block diagram of a data processing system in accordance with an illustrative embodiment.

Turning now to FIG. 7, a block diagram of a data processing system is depicted in accordance with an illustrative embodiment. Data processing system 700 can be used to implement server computer 104, server computer 106, client devices 110, in FIG. 1. In this illustrative example, data processing system 700 includes communications framework 702, which provides communications between processor unit 704, memory 706, persistent storage 708, communications unit 710, input/output (I/O) unit 712 and display 714. In this example, communications framework 702 takes the form of a bus system.

Processor unit 704 serves to execute instructions for software that can be loaded into memory 706. Processor unit 704 includes one or more processors. For example, processor unit 704 can be selected from at least one of a multicore processor, a central processing unit (CPU), a graphics processing unit (GPU), a physics processing unit (PPU), a digital signal processor (DSP), a network processor, or some other suitable type of processor.

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, can be, for example, a random-access memory or any other suitable volatile or non-volatile storage device. Persistent storage 708 may take various forms, depending on the particular implementation.

Persistent storage 708 may contain one or more components or devices. For example, persistent storage 708 can be a hard drive, a solid-state drive (SSD), a flash memory, a rewritable optical disk, a rewritable magnetic tape, or some combination of the above. The media used by persistent storage 708 also can be removable. For example, a removable hard drive can be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that can be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs can be located in storage devices 716, which are in communication with processor unit 704 through communications framework 702. The processes of the different embodiments can be performed by processor unit 704 using computer-implemented instructions, which may be located in a memory, such as memory 706.

These instructions are referred to as program code, computer usable program code, or computer-readable program code that can be read and executed by a processor in processor unit 704. The program code in the different embodiments can be embodied on different physical or computer-readable storage media, such as memory 706 or persistent storage 708.

Program code 718 is located in a functional form on computer-readable media 720 that is selectively removable and can be loaded onto or transferred to data processing system 700 for execution by processor unit 704. Program code 718 and computer-readable media 720 form computer program product 722 in these illustrative examples. In the illustrative example, computer-readable media 720 is computer-readable storage media 724.

In these illustrative examples, computer-readable storage media 724 is a physical or tangible storage device used to store program code 718 rather than a medium that propagates or transmits program code 718.

Alternatively, program code 718 can be transferred to data processing system 700 using a computer-readable signal media. The computer-readable signal media can be, for example, a propagated data signal containing program code 718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 720" can be singular or plural. For example, program code 718 can be located in computer-readable media 720 in the form of a single storage device or system. In another example, program code 718 can be located in computer-readable media 720 that is distributed in multiple data processing systems. In other words, some instructions in program code 718 can be located in one data processing system while other instructions in program code 718 can be located in a separate data processing system. For example, a portion of program code 718 can be located in computer-readable media 720 in a server computer while another portion of program code 718 can be located in computer-readable media 720 located in a set of client computers.

The different components illustrated for data processing system 700 are not meant to provide architectural limitations to the manner in which different embodiments can be implemented. The different illustrative embodiments can be implemented in a data processing system including components in addition to or in place of those illustrated for data processing system 700. Other components shown in FIG. 7 can be varied from the illustrative examples shown. The different embodiments can be implemented using any hardware device or system capable of running program code 718.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, the 706, or portions thereof, may be incorporated in processor unit 704 in some illustrative examples.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implement method of information retrieval, the method comprising:
using a number of processors to perform the steps of:
receiving a query from a user;
parsing the query in real-time as the user enters the query;
interpreting the parsed query dynamically based on a defined schema of a knowledge base, wherein interpreting the parsed query comprises generating a semantic tree from a parse tree according to a custom grammar, wherein the custom grammar recursively inspects word combinations and merges them into higher order primitives that are answerable using data in the knowledge base;
displaying a number of query interpretations in real-time as the user enters the query, each of the number of query interpretations comprising machine instructions that are executed by an information retrieval system to retrieve relevant information and display information that is used to clarify to the user how the query was interpreted and metadata necessary for executing a new search;
receiving a selection from the user of one of the query interpretations; and
retrieving information from the knowledge base according to the selection.

2. An information retrieval system, the system comprising:
a storage device configured to store program instructions; and
one or more processors operably connected to the storage device and configured to execute the program instructions to cause the system to:
receive a query from a user;
parse the query in real-time as the user enters the query;
interpret the parsed query dynamically based on a defined schema of a knowledge base, wherein interpreting the parsed query comprises generating a semantic tree from a parse tree according to a custom grammar, wherein the custom grammar recursively inspects word combinations and merges them into higher order primitives that are answerable using data in the knowledge base;
display a number of query interpretations in real-time as the user enters the query, each of the number of query interpretations comprising machine instructions that are executed by the information retrieval system to retrieve relevant information and display information that is used to clarify to the user how the query was interpreted and metadata necessary for executing a new search;
receive a selection from the user of one of the query interpretations; and
retrieve information from the knowledge base according to the selection.

3. A computer program product for retrieving information, the computer program product comprising:
a non-volatile computer readable storage medium having program instructions stored thereon to perform the steps of:
receiving a query from a user;
parsing the query in real-time as the user enters the query;
interpreting the parsed query dynamically based on a defined schema of a knowledge base, wherein interpreting the parsed query comprises generating a semantic tree from a parse tree according to a custom grammar, wherein the custom grammar recursively inspects word combinations and merges them into higher order primitives that are answerable using data in the knowledge base;
displaying a number of query interpretations in real-time as the user enters the query, each of the number of query interpretations comprising machine instructions that can be executed by an information retrieval system to retrieve relevant information and display information that is used to clarify to the user how the query was interpreted and metadata necessary for executing a new search;
receiving a selection from the user of one of the query interpretations; and
retrieving information from the knowledge base according to the selection.

4. The method of claim 1, wherein the query interpretations comprise parameterized suggested searches that include filter and sorting criteria.

5. The method of claim 1, wherein the knowledge base comprises unstructured data.

6. The method of claim 1, wherein the knowledge base comprises structured data.

7. The method of claim 1, further comprising:
automatically pre-processing documents in the knowledge base; and
storing document metadata in a queryable format.

8. The method of claim 1, wherein a librarian service represents data in the knowledge base in a standardized representation according to the defined schema.

9. The method of claim 1, wherein the defined schema comprises:
a description of entity types in the knowledge base;
a description of attributes that exist for all entity types in the knowledge base; and
a description of relationships between entities in the knowledge base.

10. The method of claim 1, wherein each query interpretation includes machine instructions for how to retrieve information from the knowledge base.

11. The method of claim 1, wherein interpreting the parsed query comprises performing speech tagging on the query received from the user.

12. The system of claim 2, wherein the query interpretations comprise parameterized suggested searches that include filter and sorting criteria.

13. The system of claim 2, wherein the knowledge base comprises unstructured data.

14. The system of claim 2, wherein the knowledge base comprises structured data.

15. The system of claim 2, wherein the processors further execute instructions to:
   automatically pre-process documents in the knowledge base; and
   store document metadata in a queryable format.

16. The system of claim 2, wherein a librarian service represents data in the knowledge base in a standardized representation according to the defined schema.

17. The system of claim 2, wherein the defined schema comprises:
   a description of entity types in the knowledge base;
   a description of attributes that exist for all entity types in the knowledge base; and
   a description of relationships between entities in the knowledge base.

18. The system of claim 2, wherein each query interpretation includes machine instructions for how to retrieve information from the knowledge base.

19. The system of claim 2, wherein interpreting the parsed query comprises performing speech tagging on the query received from the user.

20. The computer program product of claim 3, wherein the query interpretations comprise parameterized suggested searches that include filter and sorting criteria.

21. The computer program product of claim 3, wherein a librarian service represents data in the knowledge base in a standardized representation according to the defined schema.

22. The method of claim 9, wherein attributes and relationships contain metadata that describe:
   machine identity;
   type;
   display name;
   alternative names; and
   popularity score.

23. The method of claim 9, wherein the schema supports inheritance wherein child entities can be derived from parent entities.

24. The system of claim 17, wherein attributes and relationships contain metadata that describe:
   machine identity;
   type;
   display name;
   alternative names; and
   popularity score.

25. The system of claim 17, wherein the schema supports inheritance wherein child entities can be derived from parent entities.

* * * * *